United States Patent [19]

Osteen

[11] Patent Number: 4,839,565

[45] Date of Patent: Jun. 13, 1989

[54] HIGH PRESSURE DOUBLE WALL SODIUM ARC TUBE AND METHODS OF OPERATING SUCH

[75] Inventor: Mitchell M. Osteen, Zirconia, N.C.

[73] Assignee: General Electric Company, Schenectady, N.Y.

[21] Appl. No.: 33,932

[22] Filed: Apr. 3, 1987

[51] Int. Cl.⁴ ............................................. H05B 37/02
[52] U.S. Cl. ............................... 315/209 R; 315/220; 315/227 R; 313/24; 313/26; 313/27; 313/231.01
[58] Field of Search ................... 315/209 R, 105, 107, 315/220, 227; 313/560, 553, 25–27, 107, 105, 24, 231.01

[56] References Cited

U.S. PATENT DOCUMENTS

| | | | |
|---|---|---|---|
| 2,116,720 | 5/1938 | Wiegand | 313/25 |
| 2,269,819 | 1/1942 | Isenberg | 313/25 |
| 3,248,590 | 4/1966 | Schmidt | 313/174 |
| 4,065,691 | 12/1977 | McVey | 313/174 |
| 4,137,484 | 1/1979 | Osteen | 315/209 R |
| 4,490,642 | 12/1984 | Dobrusskin et al. | 313/25 |
| 4,506,369 | 3/1985 | Houston | 313/25 |
| 4,567,396 | 1/1986 | McVey | 313/25 |

FOREIGN PATENT DOCUMENTS

| | | | |
|---|---|---|---|
| 2035679 | 6/1980 | Fed. Rep. of Germany | 313/25 |
| 0815893 | 7/1959 | United Kingdom | 313/25 |
| 817100 | 7/1959 | United Kingdom | 313/25 |
| 822441 | 10/1959 | United Kingdom | 313/25 |
| 852783 | 11/1960 | United Kingdom | 313/25 |

*Primary Examiner*—Leo H. Boudreau
*Assistant Examiner*—Michael Razavi
*Attorney, Agent, or Firm*—John P. McMahon; Stanley C. Corwin; Fred Jacob

[57] ABSTRACT

A high intensity discharge metal vapor lamp comprising an arc tube having an inner chamber vented to the arc tube and disposed therein is disclosed. The combination of the arc tube and inner chamber being of a double wall construction confines the arc condition occurring between thermionic electrodes to be within the inner chamber. The inner chamber is operated at an increased wall temperature, relative to a conventional arc tube, while at the same time reducing the typically experienced sodium losses that normally occur for increased wall temperature operation. Ceramic evaporation at elevated temperatures from the inner chamber can be rendered innocuous by deposition on a similar material utilized in the arc tube. The characteristics of the arc tube allows for improved methods of its operation such as a pulsed operation at a relatively high rate of 1 to 20 KHz so as to achieve a relatively high color temperature. If desired, the arc tube may be operated in a d.c. mode while at the same time reducing the tendancy of separation between the sodium and mercury fill contained with the arc tube typically occurring for such d.c. operation.

19 Claims, 3 Drawing Sheets

HIGH PRESSURE DOUBLE WALL SODIUM ARC TUBE AND METHODS OF OPERATING SUCH

BACKGROUND OF THE INVENTION

This invention relates to high pressure sodium vapor and other high intensity discharge lamps comprising an arc tube having disposed therein an inner chamber which is opened on at least one end or has other appropriate venting ports and is operated at relatively high temperatures so as to improve the efficacy and life characteristics of the high pressure discharge lamps.

By way of example, high pressure sodium (HPS) vapor lamps have found wide spread use during the past few decades for commercial lighting applications, especially outdoor lighting. Such lamps are described in U.S. Pat. No. 3,248,590 —Schmidt, High Pressure Sodium Vapor Lamps. HPS vapor lamps typically utilize a slender tubular inner arc tube envelope of a transmissive refractory oxide material resistant to sodium at high temperatures, suitably that of high density polycrystalline alumina or synthetic sapphire. The arc tube typically contains a gas atmosphere comprised of sodium along with other additives such as xenon and mercury.

The luminous efficacy (lumens/watt) of HPS vapor lamps may be improved by increasing the operating temperature of the arc chamber of the arc tube of the HPS lamp. Such increases of and the benefits yielded by operating the arc tube at a temperature of about 1400° C. for a HPS vapor lamp are described in U.S. Pat. No. 4,567,396 of C. I. McVey issued Jan. 28, 1986. While the HPS vapor lamp of U.S. Pat. No. 4,567,396 serves well its intended function, it is desired that further increases in the operating temperature of the arc chamber be accomplished so as to further enhance the efficacy of the HPS lamps without sacrificing life.

Typically increasing the operating temperature beyond a standard practice of about 1200° C. without any special precautions causes the rate of sodium migration out of the arc tube to sharply increase. Such migration reduces the sodium and mercury ratio of this gas within the arc tube, which, in turn, causes the arc voltage within the arc tube to increase. Further, the loss of the sodium reduces the efficacy of the arc tube. The lost sodium, as well as some vaporized aluminum oxide from the arc tube, are . deposited on the vitreous outer envelope of the HPS vapor lamp. Such deposits are manifested as light-absorbing brown layers which decreases the amount of light emitted by the lamp and also increases the amount of radiation retained inside the outer envelope. The retained radiation causes the arc tube temperature to rise, thereby increasing its gas pressure and arc voltage which also results in lowering the efficacy of HPS vapor lamp along with increasing the necessary ballasting conditions to properly operate the lamp. It is desired that the operating temperature of the arc tube be increased beyond the standard design practice of the about 1200° C. limit without suffering the normal resulting serious loss in efficacy through life.

Accordingly, an object of the present invention is to provide an arc tube for a HPS lamp which is capable of being operated at relatively high wall temperature substantially above 1200° C. while at the same time reducing the sodium losses that typically occur for such high temperature operation and the corresponding loss in efficacy.

A further object of the present invention is to provide methods for operating the improved arc tube to achieve enhanced color output of the high pressure sodium vapor lamp.

These and other objects of the present invention will become more apparent upon consideration of the following description of the invention.

SUMMARY OF THE INVENTION

This invention is directed to a high pressure sodium (HPS) vapor and other high intensity discharge lamps comprising an arc tube having an inner chamber opened at least one end or having other appropriate venting ports and disposed therein which is operated at a relatively high wall temperature while at the same time the typically expected sodium losses for such increased wall temperature are reduced. The invention is further directed to a pulsing method of operating the lamp which yields improved color light output. Further, the invention is directed to a d.c. method of operation which mitigates the adverse consequences of cataphoretic separation of arc constituents.

The HPS vapor lamp related to the present invention comprises an outer vitreous envelope, support and electrical connection means disposed within the outer envelope, and an arc tube connected to the support and electrical connection means. The arc tube has disposed therein means to support an inner chamber typically formed of a polycrystalline aluminum ceramic and which is appropriately vented. The arc tube further has a pair of thermionic electrodes sealed therein and which are respectively located at opposite ends of the inner chamber. The thermionic electrodes are spaced apart from each other by a predetermined distance effective when energized to cause an arc condition to occur therebetween and remain within the inner chamber. The arc tube contains a sodium partial pressure along with a noble gas such as xenon. Mercury may also be utilized serving its conventional purposes in the state of the art.

DETAILED DESCRIPTION OF THE PREFERRED EMBODIMENTS

Figure 1:
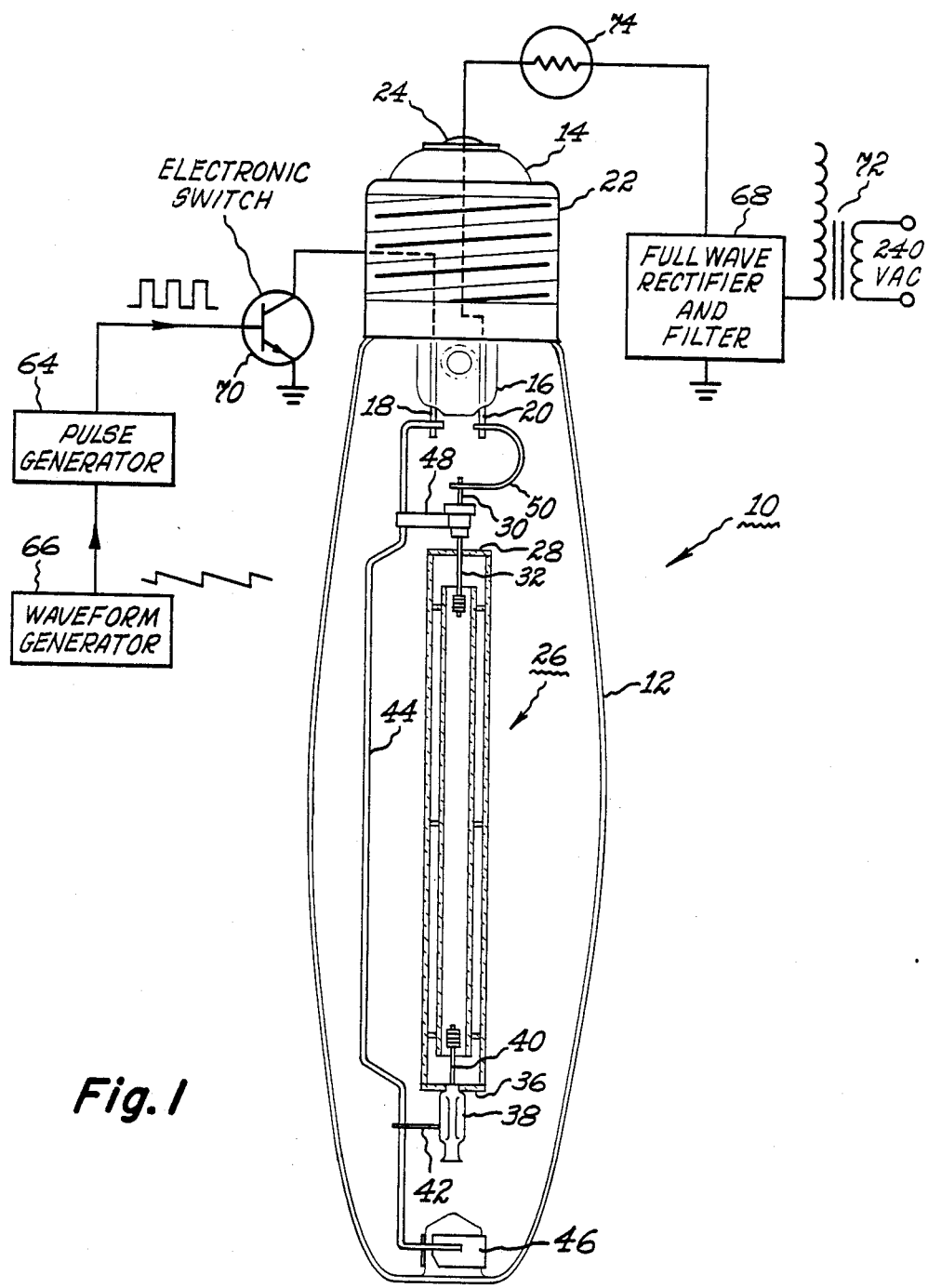
FIG. 1 is a front elevation view, with partial section, of a high pressure sodium (HPS) vapor lamp according to one embodiment of the present invention along with a schematic representation of a pulsed ballast circuit for operating the HPS vapor lamp.

A high pressure sodium (HPS) vapor lamp of one embodiment of the present invention is illustrated in FIG. 1. The HPS vapor lamp 10 comprises a vitreous outer envelope 12 which is attached to a standard mogul screw base 14 shown in the upper portion of FIG. 1. The lamp 10 further comprises a stem 16 having a pair of relatively heavy lead-in conductors 18 and 20 with extending ends therethrough and having the other ends connected to the screw shell 22 and eyelet 24 of the base.

The HPS lamp has an arc tube 26 centrally located within the outer envelope 12. The upper end of the arc tube is closed by an alumina ceramic seal 28 through which extends a niobium inlead 30 that supports an upper electrode 32 within the arc tube 26. The lower end of the arc tube 26 has a closure which comprises a ceramic plug 36 through which extends a thin-walled niobium tube 38 which is connected to the lower electrode 40. The ceramic seals 28 and 36 are described in greater detail in U.S. Pat. No. 4,065,691 —McVey Ceramic Lamps Having Electrode Support By Crimped Tubular Inleads. The niobium tube 38 serves as both an inlead for the arc tube 26 and as a reservoir for storing excess alkali metal and mercury contained in the arc tube 26. A shank on the lower electrode 40 of the arc tube 26 projects into the niobium reservoir 38 and is locked in place by crimping the niobium reservoir about the lower electrode.

The reservoir 38 is connected, by means of a crossmember 42, to a relatively heavy electrical conductive member 44 having one of its ends connected to lead-in 18 and its other end anchored to a dimple of lamp 10 by means of a clip member 46. The member 44 provides the support for inlead 30 of arc tube 26 by means of crossmember 48. The inlead 30 is connected to the relatively heavy inlead 20 by means of a curved electrically conductive member 50.

Figure 2:
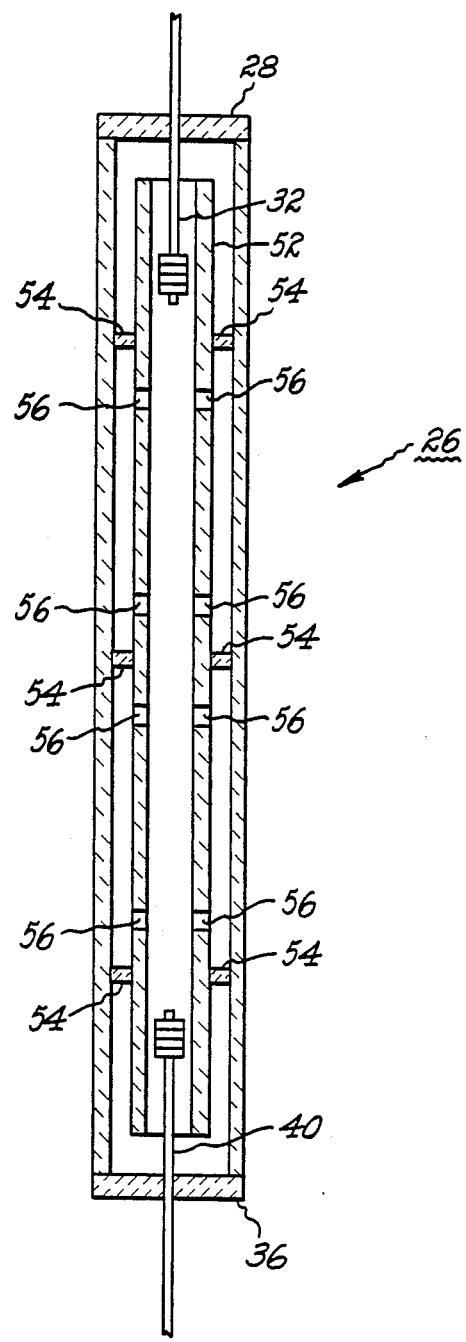
FIG. 2 is a cross-sectional view of the arc tube of the present invention.

The arc tube 26 which is connected to the described support and electrical connection means of lamp 10 is of primary importance to the present invention and is shown in an enlarged manner in FIG. 2. The arc tube 26 is a double wall device formed by having an inner chamber 52 disposed therein. The arc tube 26 has located therein means 54 which support the inner chamber 52. The support means 54 positions the inner chamber 52 relative to the arc tube 26. The arc tube 26 and the inner chamber 52 may also be comprised of a single member with appropriate tie members to provide separation therebetween.

The inner chamber 52 may be open at both of the ends and have the pair of thermionic electrodes 32 and 40 sealed in the arc tube 26. Alternately, the inner chamber 52 may be opened at one end. Further, the inner chamber 52 may be closed at both ends and have appropriate venting ports such as at least one opening 56 between its inner and outer surfaces longitudinally located along its wall portion as shown in FIG. 2. In all of the various arrangements of the inner chamber 52 it is only necessary that the inner chamber 52 be suitably vented to the arc tube to allow readily unimpeded gaseous exchange of the constituents of the fill ingredients within the inner chamber 52 and arc tube 26.

The thermionic electrodes 32 and 40 are spaced apart from each other by a predetermined distance in the range of about 10 mm to about 350 mm and are effective when energized to cause an arc therebetween which remains within the inner chamber 52. The spacing between the electrodes is dependent on the desired wattage, current, loading and other typical design considerations. The inner chamber 52 of the arc tube 26 is formed of a translucent ceramic, quartz or preferably a polycrystalline alumina ceramic. The arc tube 26 is formed of polycrystalline alumina ceramic, single crystal alumina, yittria, vanadia, quartz or hard glass. The arc tube 26 has typical dimensions of an inner diameter of at least of about 5 mm, a length in the range of about 20 mm to about 365 mm, and a wall thickness of at least 0.5 mm. The inner chamber has an inner diameter of at least about 3 mm, a length in the range of about 15 mm to about 360 mm, and a wall thickness of at least 0.4 mm.

The arc tube 26 having the given dimensions contains an operating sodium partial pressure in the range of about 20 Torr to about 80 Torr. The arc tube may further contain a xenon gas having a fill pressure in the range of about 10 Torr to about 500 Torr. If desired, the fill of the arc tube may further comprise mercury in a sodium to mercury weight ratio of about 0.1 to 0.4.

The double walled arc tube of the present invention allows for increased operating temperature relative to the prior art arc tubes disclosed in the "BACKGROUND" section. The arc tube having a fill previously disclosed is operating such that its outer wall temperature is maintained below the previously discussed operating limit of 1200° C. wall temperature. Conversely, the wall temperature of the inner chamber is operated well beyond the 1200° C. limitation such as in the range of about 1300° to 1700° C. Sodium migration that occurs because of this increased wall temperature of the inner chamber is compensated for by the present invention by a closed loop return path. The vaporization of the ceramic comprising the inner chamber is rendered innocuous by its redeposition on the inner wall of the arc tube. Further, the location on the thermionic electrodes being within the inner chamber confines or restricts the arc between the thermionic electrodes to remain within the volume determined by the inner chamber itself.

Figure 3:
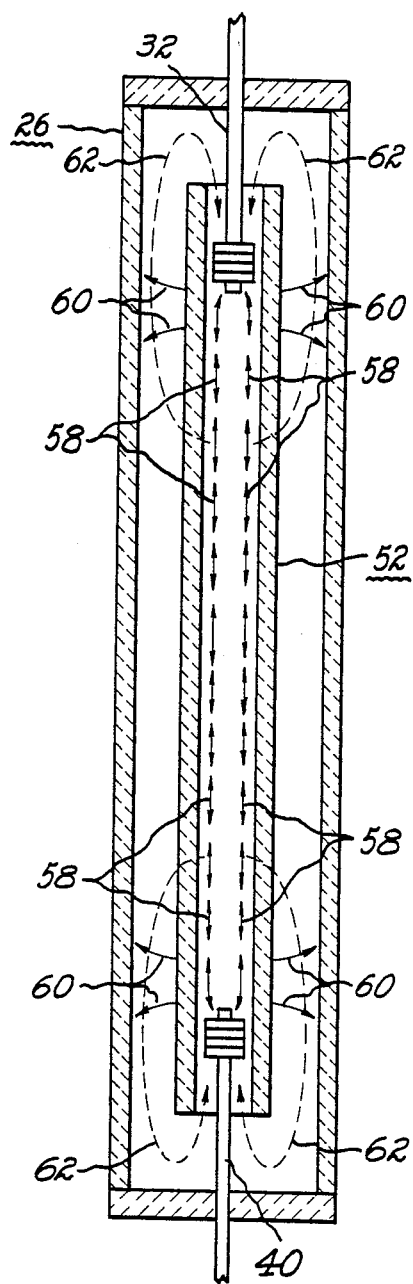
FIG. 3 is a schematic representation illustrating the sodium migration, vaporization and material depositions related to the present invention.

The operation of the arc tube 26 may be described with reference to FIG. 3 schematically showing, in an enlarged member, the electrodes 32 and 40 within the inner chamber 52 without support means 54. The arc that occurs between the electrodes 32 and 40 is representatively illustrated by a plurality of two headed arrows 58 indicating the arc between electrodes 32 and 40 is of a bilateral type for alternating current (A.C.) activation of the arc tube. More importantly, the arrows 58 are meant to indicate that the arc between the electrodes is confined to remain within the inner chamber.

The vaporization of the materials of inner chamber caused by the increased high wall temperature and the redeposit of the related materials onto the inner walls of the arc tube are illustrated by a plurality of curved arrows 60 located along the length of the inner chamber. This vaporization and redeposit of the related materials does not produce brownish light absorbing layers discussed in the "Background" section in that the materials of the inner chamber 52 is the same as or similar to the material of the arc tube 26 and therefore substantially combine without any degrading discoloration of the arc tube itself.

The sodium migration caused by the increased high wall temperature is indicated by a plurality of arrows 62 shown in phantom as leaving the inner chamber along its length. A major portion of this sodium migration finds its way back into the inner chamber as shown by the curvature of the arrows 62. It is believed that this major portion represents approximately all of the sodium migration once equilibrium concentration gradients are established.

The arc tube of the present invention may be advantageously operated in a pulsed mode such as that described in my U.S. Pat. No. 4,137,484 issued Jan. 30, 1979 and herein incorporated by reference. The circuit components for operating the lamp 10 in a pulsed manner are generally shown in FIG. 1 as of a pulsed generator 64, a waveform generator 66, a full wave rectifier and filter 68, an electronic switch 70, a transformer 72, and ballast element 74 respectively described in detail in U.S. Pat. No. 4,137,484 with regard to reference numbers 31, 29, 25, 28 26 and 27 to which reference may be made for further details and operation of these components.

The electrodes 32 and 40 are spaced apart in a manner previously described so as to produce, at rated power input such as 400 watts, a sodium vapor pressure which causes self-reversal and broadening of the sodium resonance lines in a manner such as that disclosed in U.S. Pat. No. 4,137,484. The HPS lamp 10 incorporating the present invention may be energized by the electrical pulses described in U.S. Pat. No. 4,137,484. The pulses have a rise time rapid enough and a time duration short enough to produce in addition to the light resulting from the self-reversal and the broadening in the D lines, a substantial light in the blue green side of the spectrum whereby the color temperature of the HPS lamp is enhanced to a value such as 2600° K. It is preferred that the electrical pulses have a repetition rate in the range of about 2 KHz to about 20 KHz. Further, it is preferred that the repetition rate have a duty cycle of about 10% to about 35%.

The inner chamber 52 provides a close proximity between the inner wall of the chamber 52 and the arc between the electrodes so that it is possible to achieve faster cooling of the arc. Further, this close proximity provides faster cooling and/or deionization of the arc which permits and provides for higher frequency repetition rates and/or shorter off times diminishing acoustic, strobosopic and electronic challenges.

The arc tube of the present invention may also be operated in a direct current (d.c.) mode of operation. For such operation the pulse generator 64, waveform generator 66 and electronic switch 70 shown in FIG. 1 may be removed and the full-wave rectifier and filter 60 having the connected transformer 72 is applied across the electrodes 32 and 40 with the ballast element 74 in series with electrode 32. A d.c. rectified voltage of about 100 operating volts is maintained across the electrodes 32 and 40 so as to yield a desired light output. Typical for such d.c. mode of operation of an arc tube not having the benefits of the present invention, there is a tendency for cataphoretic separation of the sodium and mercury within the arc tube itself. This tendency is greatly reduced by the present invention in that this configuration provides a return path to the arc to ease this separation problem.

It should now be appreciated that the practice of the present invention provides an arc tube having the capabilities of being operated at an increased wall temperature while reducing the typically experienced sodium losses occurring at such high increased wall operating temperature. It should be further appreciated that the practice of the present invention provides for an arc tube that is particularly suited for operation in pulsed mode at a preferred higher frequency operation. Still further, it should be appreciated that the practice of the present invention provides for a d.c. mode of operation that is less susceptible to causing cataphoretic separation of the sodium and the mercury within the fill of the arc tube itself.

What I claim as new and desire to secure by Letters Patent of the United States is:

1. A high intensity discharge metal vapor lamp comprising:
   support and electrical connection means; and
   an arc tube connected to said support and electrical connection means, said arc tube having disposed therein means to support an inner chamber comprised of a translucent material, said inner chamber containing appropriate fill constituents and may be closed at both ends have appropriate venting ports such as at least one opening between its inner and outer surfaces longitudinally located along its wall portion, said inner chamber being suitably vented to the arc tube to allow readily unimpeded gaseous exchange of the constituents of the fill ingredients within the inner chamber and the arc tube, said arc tube further having a pair of thermionic electrodes sealed therein, said thermionic electrodes being spaced apart from each other by a predetermined distance effective when energized to cause an arc therebetween within said inner chamber, said arc tube containing a metal partial pressure.

2. A high intensity discharge metal vapor lamp according to claim 1 wherein said arc tube further contains a mercury ingredient.

3. A high intensity discharge metal vapor lamp according to claim 1 wherein said arc tube further contains a sodium ingredient.

4. A high intensity discharge metal vapor lamp according to claim 1 wherein said arc tube further contains at least one noble starting gas.

5. A high intensity discharge metal vapor lamp according to claim 1 wherein said arc tube further contains a plurality of metal partial pressures.

6. A high intensity discharge metal vapor lamp according to claim 1 wherein said arc tube further contains one or more noble gases for starting.

7. A high intensity discharge metal vapor lamp according to claim 1 wherein said arc tube is formed of a material selected from the group comprising polycrystalline alumina ceramic, single crystal alumina, yittria, vanadia, quartz and hard glass.

8. A high intensity discharge metal vapor lamp according to claim 1 wherein said inner chamber is formed of a material selected from the group comprising a translucent ceramic, quartz and polycrystalline alumina ceramic.

9. A high intensity discharge metal vapor lamp according to claim 1 wherein said inner chamber comprises a cylindrical configuration with an opening at least on one end.

10. A high intensity discharge metal vapor lamp according to claim 1 wherein said inner chamber comprises a generally closed configuration and has at least one opening for gaseous exchange with said arc tube.

11. A high intensity discharge metal vapor lamp comprising:
    an outer vitreous envelope;
    support and electrical connection means disposed within said outer envelope; and
    an arc tube connected to said support and electrical connection means, said arc tube having disposed therein means to support an inner chamber comprises of a translucent material, said inner chamber containing appropriate fill constituents and may be closed at both ends and have appropriate venting ports such as at least one opening between its inner and outer surfaces longitudinally located along its wall portion, said inner chamber being suitably vented to the arc tube to allow readily unimpeded gaseous exchange of the constituents of the fill ingredients within the inner chamber and the arc tube, said arc tube further having a pair of thermionic electrodes sealed therein, said thermionic electrodes being spaced apart from each other by a predetermined distance effective when energized to cause an arc therebetween within said inner chamber, said arc tube containing a metal partial pressure.

12. A high intensity discharge metal vapor lamp according to claim 11 wherein said arc tube further contains a mercury ingredient.

13. A high intensity discharge metal vapor lamp according to claim 11 wherein said arc tube is formed of a material selected from the group comprising polycrystalline alumina ceramic, single crystal alumina, yittria, vanadia, quartz and hard glass.

14. A high intensity discharge metal vapor lamp according to claim 11 wherein said inner chamber is formed of a material selected from the group comprising a translucent ceramic, quartz and polycrystalline alumina ceramic.

15. A high intensity discharge metal vapor lamp according to claim 11 wherein said inner chamber has at least one opening between its inner and outer surfaces longitudinally located along its wall portion.

16. A high intensity discharge metal vapor lamp according to claim 11 wherein said arc tube further contains a sodium ingredient.

17. A method of operating a high intensity discharge metal vapor lamp of a kind comprising an arc tube containing a fill of sodium and having disposed therein an inner chamber which may be closed at both ends and have appropriate venting ports such as at least one opening between its inner and outer surfaces longitudinally located along its wall portions and being suitably vented to the arc tube to allow readily unimpeded gaseous exchange of the constituents of the fill ingredients within the inner chamber and the arc tube, said inner chamber having disposed therein spaced electrodes which are spaced to produce, at rated power input, a sodium vapor pressure causing self-reversal and broadening the sodium resonant D lines, said method comprising;

energized said lamp by electrical pulses so as to produce approximately said rated power input, said pulses having a rise rapid enough and a time duration short enough to produce, in addition to the light resulting from the self-reversal and broadening of the sodium D lines, substantial light in the blue-green side of the spectrum whereby the color temperature is increased.

18. A method of operating a high intensity discharge vapor lamp according to claim 16 wherein said electrical pulses have a repetition rate of in the range of about 2 KHz to about 20 KHz.

19. The method of claim 18 wherein the repetition rate has a duty cycle of about 10% to about 35%.

* * * * *